(12) United States Patent
Gruenwald et al.

(10) Patent No.: US 6,484,830 B1
(45) Date of Patent: Nov. 26, 2002

(54) HYBRID ELECTRIC VEHICLE

(75) Inventors: Robert Gruenwald, Cincinnati, OH (US); Jeff T. Major, Cygnet, OH (US); Anthony J. Palumbo, Perrysburg, OH (US)

(73) Assignee: Bowling Green State University, Bowling Green, OH (US)

( * ) Notice: Subject to any disclaimer, the term of this patent is extended or adjusted under 35 U.S.C. 154(b) by 0 days.

(21) Appl. No.: 09/558,048

(22) Filed: Apr. 26, 2000

(51) Int. Cl.$^7$ ............................................. B60K 6/04
(52) U.S. Cl. ................... 180/65.2; 180/65.3; 180/65.8; 701/22; 701/54
(58) Field of Search ................. 180/65.1, 65.2, 180/65.3, 65.4, 65.8, 65.6; 318/139, 376; 701/22, 27, 36, 54

(56) References Cited

U.S. PATENT DOCUMENTS

| | | | |
|---|---|---|---|
| 4,766,967 A | * 8/1988 | Slicker et al. ............. 180/54.1 |
| 5,214,358 A | * 5/1993 | Marshall ..................... 318/139 |
| 5,323,868 A | * 6/1994 | Kawashima ................ 180/65.4 |
| 5,789,882 A | * 8/1998 | Ibaraki et al. ............... 318/148 |
| 5,806,617 A | * 9/1998 | Yamaguchi ................. 190/65.2 |
| 5,898,282 A |   4/1999 | Drozdz et al. .............. 318/139 |
| 5,898,292 A | * 4/1999 | Drozdz et al. .............. 318/139 |
| 5,910,722 A |   6/1999 | Lyons et al. ................. 320/104 |
| 5,939,794 A |   8/1999 | Sakai et al. ................. 290/40 A |
| 5,939,848 A | * 8/1999 | Yano et al. .................. 318/139 |
| 5,941,328 A | * 8/1999 | Lyons et al. ................. 180/65.1 |
| 6,073,712 A | * 6/2000 | Buglione .................... 180/65.2 |
| 6,098,733 A | * 8/2000 | Ibaraki et al. ............... 180/65.2 |
| 6,116,368 A | * 9/2000 | Lyons et al. ................. 180/165 |
| 6,124,690 A | * 9/2000 | Yano et al. .................. 318/376 |
| 6,137,250 A | * 10/2000 | Hirano et al. ................ 318/376 |
| 6,177,773 B1 | * 1/2001 | Nakano et al. .............. 318/376 |
| 6,205,379 B1 | * 3/2001 | Morisawa et al. ............ 701/22 |
| 6,209,672 B1 | * 4/2001 | Severinsky ................. 180/65.2 |
| 6,232,744 B1 | * 5/2001 | Kawai et al. ................ 320/132 |
| 6,233,508 B1 | * 5/2001 | Deguchi et al. .............. 701/22 |
| 6,234,932 B1 | * 5/2001 | Kuroda et al. ................. 477/3 |
| 6,242,873 B1 | * 6/2001 | Drozdz et al. .............. 318/139 |

OTHER PUBLICATIONS

Viterna, Larry A., Hybrid Electric Transmit Bus, Automotive Engineering International, Nov. 1998, pp. 127–129.
Hazard, Greg, Electric Racecar Series for USA Students, Racecar, vol. 9, No. 4, May, 1999, pp. 35–38.
Brewster, Dennis et al., BGSU Electric Falcon, Totally Charged, Spring, 1998, 4 pp.
Brewster, Dennis et al., BGSU Electric Falcon, Totally Charged, Spring, 1999, 4 pp.
Hybrid Electric Vehicle Program, Energy Security and Clean Air, http://www.hev.doe.gov/general.ontheroad.html, Aug., 1999, 6 pp.

(List continued on next page.)

*Primary Examiner*—Brian L. Johnson
*Assistant Examiner*—J. Allen Shriver
(74) *Attorney, Agent, or Firm*—Standley & Gilcrest LLP

(57) ABSTRACT

A hybrid electric propulsion system for powering a vehicle using a natural fuel engine and an electric motor. The hybrid electric vehicle is comprised of a drive train; an electric motor for driving the drive train; an auxiliary power unit (APU); an electric energy storage system electrically coupled to the electric motor; and wherein the auxiliary power unit and the electric energy storage system provide energy for powering the vehicle. An electric bus is directly connected to both the auxiliary power unit and the electric energy source and the voltage across the electric bus is substantially the same as the voltage across the electric energy source so that a change in voltage of the electric bus results in the same change to the voltage across the electric energy source. A power management controller is programmed to control output power of the power unit to maintain the energy storage system between a predetermined high voltage set-point and a predetermined low voltage set-point.

42 Claims, 11 Drawing Sheets

OTHER PUBLICATIONS

Hybrid Electric Vehicle Program, Batteries, http://www.hev.doe,gov/components/batteries.html, Aug., 1999, 3 pp.

Hybrid Electric Vehicle Program, Series Hybrid Vehicle, http://www.hev.doe.gov/general/series.html, Aug., 1999, 1 pp.

Hybrid Electric Vehicle Program, Series Hybrid Vehicles, http://www.hev.doe.gov/general/parallel.html, Aug., 1999, 1 pp.

Hybrid Electric Vehicle Program Hybrid Electric Vehicle Component Information, http://www.hev.doe.gov/components/component.html, Aug., 1999, 2 pp.

Hybrid Electric Vehicle Program—Components, Motor/Controller, http://www.hev.doe.gov/components/motor controller.html, Aug. 1999, 1 pp.

Hybrid Electric Vehicle Program—Components, Electric Energy Storage, http://www.hev.doe.gov/components/storage.html, Aug. 1999, 2 pp.

Hybrid Electric Vehicle Program—Components, Ultracapacitors, http://www.hev.doe.gov/components/ultra.html, Aug. 1999, 1 pp.

Hybrid Electric Vehicle Program—Components, Hybrid Power Unit (HPU), http://www.hev.doe.gov/components/apu.html, Aug. 1999, 1 pp.

Hybrid Electric Vehicle Program—Components, Fuel Cell, http://www.hev.doe.gov/components/fuelce.html, Aug. 1999, 1 pp.

Hybrid Electric Vehicle Program—Components, Fuels, http://www.hev.doe.gov/components/fuel.html, Aug. 1999, 2 pp.

Hybrid Electric Vehicle Program, HEV Emission Control, http://www.hev.doe.gov/general/emission.html, Aug. 1999, 1 pp.

Hybrid Electric Vehicle Program—Components, Energy Management and System Control, http://www.hev.doe.gov/components/energman.html, Aug. 1999, 2 pp.

Hybrid Electric Vehicle Program—Components, Thermal Management of HEV Components, http://www.hev.doe.gov/components/thermal.html, Aug. 1999, 2 pp.

Hybrid Electric Vehicle Program—Components, Regenerative Braking, http://www.hev.doe.gov/components/regen.html, Aug. 1999, 1 pp.

Exploratorium Snack Home Page, Stripped Down Motor, http://www.exploratorium.edu/snacks/stripped down motor.html, Aug., 1999, 4 pp.

* cited by examiner

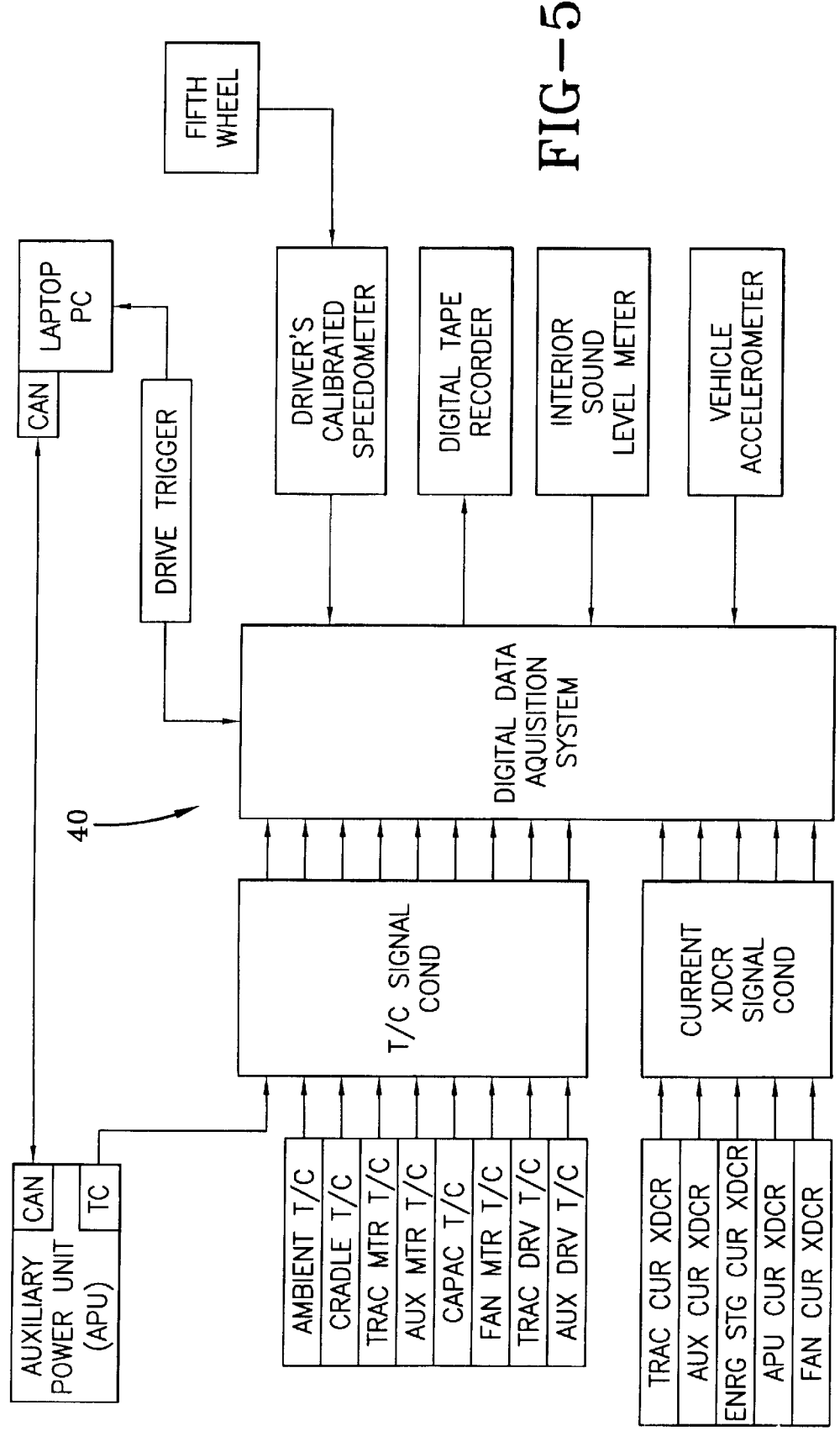

HYBRID ELECTRIC VEHICLE

BACKGROUND AND SUMMARY OF THE INVENTION

The present invention relates to an environmental friendly vehicle. More particularly, the present invention relates to a hybrid electric vehicle (HEV).

The HEV of the present invention uses an engine in combination with an electric motor. An energy storage device is also used to store energy for driving the electric motor. The engine, preferably in conjunction with a generator (for series drive embodiment or without for a parallel embodiment), and the energy storage device work in combination to provide energy for powering the vehicle motor. A series HEV uses an engine with a generator (APU/PPU) to supply electricity to the motor and the energy storage system. A parallel HEV has a direct mechanical connection between the engine and the wheels. The use of electric power substantially cuts down on chemical emissions and vastly improves fuel economy. Although HEVs have been previously known, the HEV technology of the present invention provides significant advantages of providing a viable HEV technology that allows for a high performance HEV with a unique power management and distribution system.

The preferred embodiment of the present invention is based on the assembly and modification of hardware components and incorporation of control logic to produce a hybrid vehicle drive system that can utilize capacitive energy storage devices without addition of buck-boost or other similar electronic hardware between capacitor and electrical drive components to convert variable voltage power to fixed voltage power. The present invention is applicable to both series and parallel hybrid drive configurations and can utilize conventional batteries, flywheels, as well as ultra-capacitors.

Traditional electric hybrid vehicle drive systems have been set up using batteries for storage. Batteries are designed to operate at or near constant voltage as they are discharged and charged. Battery hybrid components are sized to operate at this nominal voltage. Control strategies for the Auxiliary Power Unit (APU), also referred to as the Primary Power Unit (PPU), are designed to hold the voltage within narrow values or set-points near the nominal voltage. When one tries to replace batteries directly with capacitors, the battery control system strategy, which is designed to maintain the voltage level, cannot take full advantage of capacitor storage. This under-utilization results in poor fuel economy, and for undersized APU/PPUs, poor vehicle performance will result.

To store energy in a capacitor, voltage must be allowed to vary up and down. The greater the variation, the more energy can be stored and extracted. Electrical components designed for constant voltage (battery) operation cannot deliver rated power when operated below narrow voltage parameters or set-points. These components will also overheat if operated at low voltage for extended periods. Control strategies set to protect these components will cut back output, reducing vehicle performance or cause a safety trip out. When voltage begins to rise above the nominal set-point, as during regenerative braking, the battery system control strategy tapers back APU/PPU output and reduces regeneration effect. If voltage was allowed to rise as would be needed to properly charge a capacitor bank, the control system will cause an over-voltage trip out, or if left unchecked, will damage components.

Even if the control over-voltage trip is removed, and components were sized to take the over-voltage condition, typical battery-type traction inverter drives produce unstable performance. This is usually because inverters set up for battery systems are not equipped with the control logic and high-speed data sampling needed to deal with the transient current spikes developed by low-inductance motors operating at low motor speeds and at higher-than-rated voltage. This is the condition that exists with a fully charged capacitor bank when a vehicle is starting up from rest.

Furthermore, constant voltage APU/PPUs will not deliver power to the traction drive when voltage is above the nominal set-point. This strategy does not allow it to share part of the initial load when accelerating the vehicle until voltage is near nominal. An optimally sized capacitor bank will become depleted before the acceleration event is completed. This situation would require the APU/PPU to operate in an uneconomical peaking mode to finish the acceleration cycle or require a larger and proportionally costly and heavier capacitor bank. Conversely, during braking, a constant voltage APU/PPU will work to add power to the storage system. In an optimally sized capacitor bank, the capacity for capturing the braking energy would be reduced. Again, this would require a larger capacitor bank to accommodate this situation.

One solution to overcoming the variable voltage requirement for capacitor storage is to install an electronic device between the drive system set up for batteries and the capacitor bank. This device, usually of the buck-boost design, would convert the variable voltage power required to take advantage of the capacitor storage to the near constant voltage needed by the battery traction system. In other words, make the capacitor look like a battery. This solution adds expense and complexity to the system and lowers the efficiency of a capacitor storage system.

In the present invention, components and control strategies have been designed to allow for a wide fluctuation in voltage without performance loss or nuisance trip outs. APU/PPU performance is optimized with the least amount of capacitor bank requirement. The present system does not require additional devices between the drive and capacitor bank. In other words, the system electric bus is preferably connected to the ultracapacitor so that the electric bus voltage equals the capacitor voltage. The capacitor voltage varies directly with the variance of the electric bus voltage.

The preferred embodiment of the present invention is comprised of four major components:

1. One or more low inductance traction motor(s), capable of delivering rated torque and power at the low voltage set-point;
2. One or more traction inverter(s) capable of delivering rated power at the low voltage set-point. Components sized to operate at the high voltage set-point. Control set up to eliminate instability at high voltage when using a low inductance motor.
3. One or more APU/PPUs, comprised of a generator for a series embodiment, powered from an engine of any variety. This APU/PPU is designed to deliver rated power between high and low voltage set-points, peak vehicle power when energy in capacitor bank is depleted, and average power during acceleration. The engine can be mechanically connected in a parallel hybrid configuration and utilize the induction motor as the generator.
4. One or more capacitor bank(s) sized to deliver traction power above average requirement for accelerating the vehicle to rated speed and capturing braking energy from regeneration.

The control strategy of the preferred embodiment of the present invention utilizes the following:
1. Input parameters used in the control calculation preferably include engine speed, motor speed, vehicle speed, temperature, electrical bus voltage, motor current, generator current, positive or forward (acceleration) command, direction, and negative (deceleration) command. Other inputs may also be included depending on application.
2. Control output commands preferably include motor torque, generator voltage and current, engine speed, engine power, and shift command for transmission equipped vehicles. Other outputs may be included depending on application.

In the preferred embodiment of the present invention, the electric vehicle power management system is comprised of:
   an electric motor;
   an auxiliary power unit (APU) electrically coupled to the electric motor;
   an ultracapacitor electrically coupled to the electric motor and the auxiliary power unit; and
   where the auxiliary power unit and the ultracapacitor provide energy to the electric motor for powering said vehicle;
   a power management controller is programmed to control the auxiliary power unit to vary output power to maintain the ultracapacitor between a predetermined high voltage set-point and a predetermined low voltage set-point;
   where the power management controller runs the output of the auxiliary power unit up to the predetermined average power level when the ultracapacitor is at a predetermined range between the high and low voltage set-points, the range having a low threshold point and high threshold point;
   where the power management controller is adapted to increase the output of the auxiliary power unit when the energy level of the ultracapacitor falls below the low threshold point of the range; and
   wherein the power management controller is adapted to decrease the output of the auxiliary power unit when the energy level of the energy storage system reaches the high threshold point of the range.

In the preferred embodiment, the power management controller maintains the system within a predetermined vehicle speed to capacitor voltage ratio by controlling the output power of the auxiliary power unit.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 5 illustrates one embodiment of the instrumentation system of the present invention;

DETAIL DESCRIPTION OF PREFERRED EMBODIMENT(S)

The preferred system herein described is not intended to be exhaustive or to limit the invention to the precise forms disclosed. They are chosen and described to explain the principles of the invention and the application of the method to practical uses so that others skilled in the art may practice the invention.

Series Embodiment

Figure 1:
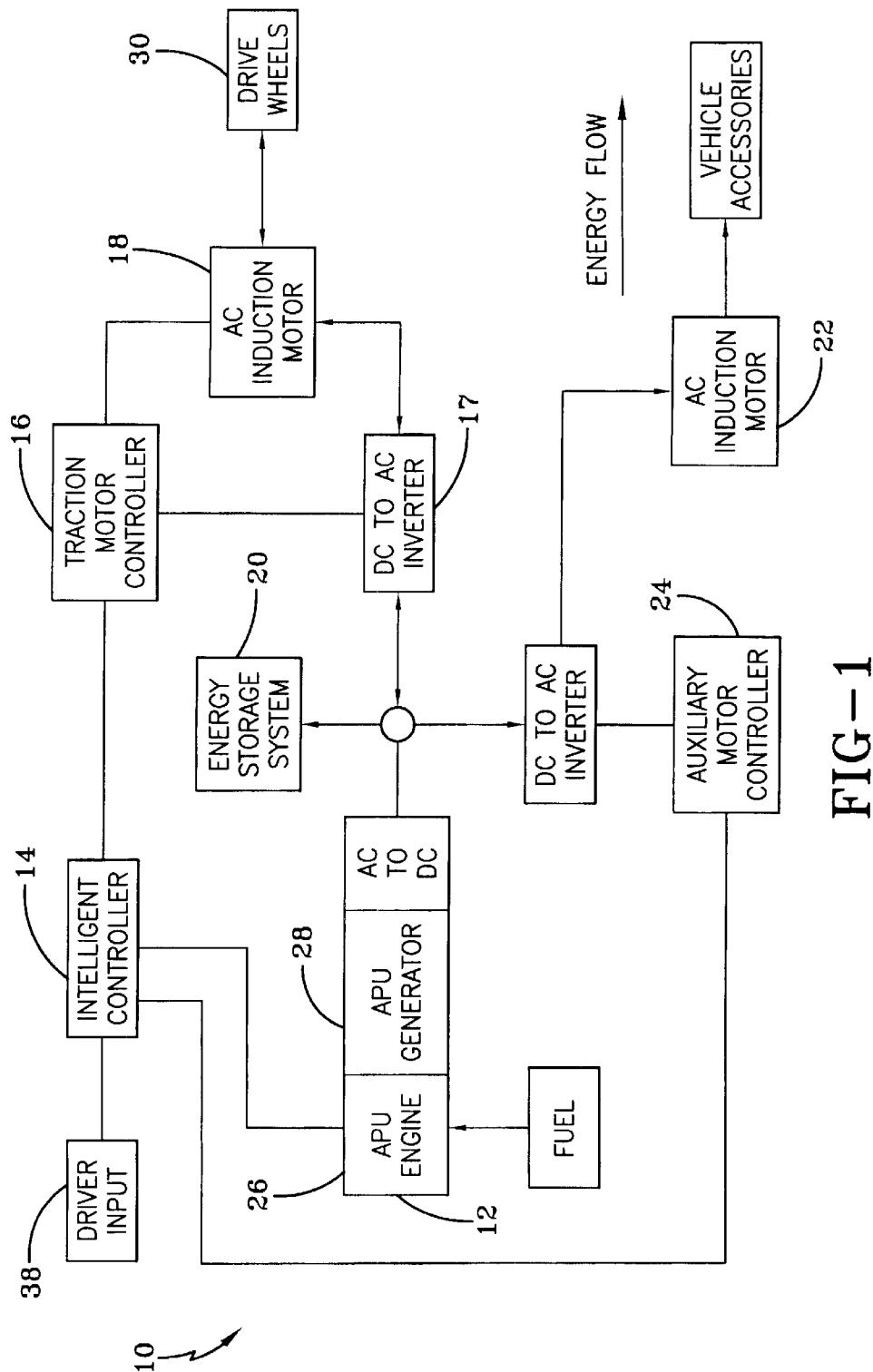
FIG. 1 illustrates a schematic of a series hybrid electric vehicle.

In the preferred embodiment, the series embodiment is a engine dominated, capacitor assisted, series hybrid vehicle. FIG. 1 illustrates a schematic of a series hybrid electric vehicle (HEV) drive system 10. In one embodiment, the HEV of the present invention is comprised of an auxiliary power unit (APU) 12, an intelligent controller 14, a motor controller 16, a motor 18, and an energy storage system 20. The system 10 may also include an auxiliary motor 22 and controller 24 for driving various vehicle accessories. These vehicle accessories may include lighting, heating, pneumatics, hydraulics, and other vehicle systems.

In one embodiment, the APU 12 includes a gas engine 26 which drives a generator 28 (in the series embodiment). The generator produces the electricity which is stored in the energy storage system 20. In an alternative embodiment, a fuel cell may be used to convert fuel directly into electricity.

In one embodiment, the motors 18, 22 are alternating current (AC) induction motors. In another embodiment, a direct current (DC) motor may be used. In one embodiment, the electric motor 18 is the only device of the system 10 that drives the wheels 30 (series embodiment). In an alternate HEV system, the auxiliary engine 26 could also be used to drive the wheels 30 in conjunction with the electric motor 18 (parallel—a mechanical connection is set up between the auxiliary engine 26 and the wheels 30). The electric motor 18 has an electrical conductor in the presence of a magnetic field. The electrical conductor experiences a force that is proportional to the product of the current and the strength of the magnetic field. The motor controller 16 receives a signal originating from the accelerator pedal in the vehicle and controls the electric energy provided to the motor 18 via inverter 17. The energy supplied to the motor 18 causes torque to rotate the wheels 30. In one embodiment of the series HEV (the preferred embodiment of the present invention), the electric motor 18 derives energy from both the energy storage system 20 and the APU generator 28. In another embodiment of the series HEV, the wheels are driven strictly by energy supplied by the energy storage system 20.

For typical HEVs, the energy storage system 20 may be selected from the group of batteries, flywheels, or ultracapacitors. In the preferred embodiment of the present invention, ultracapacitors are used as described in more detail below.

Figure 2:
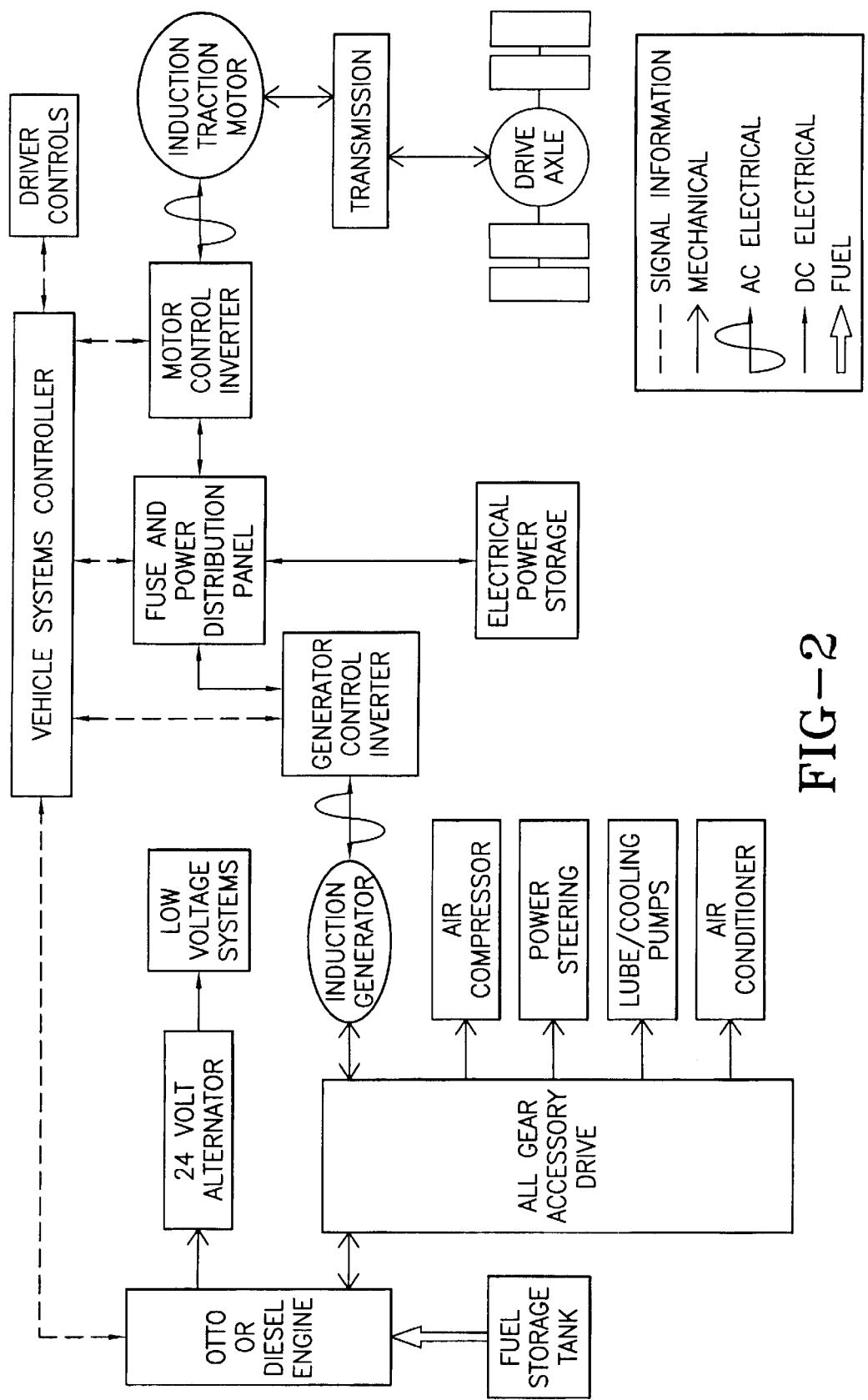
FIG. 2 illustrates one embodiment of a series hybrid electric vehicle of the present invention with a conventional engine.
Figure 3:
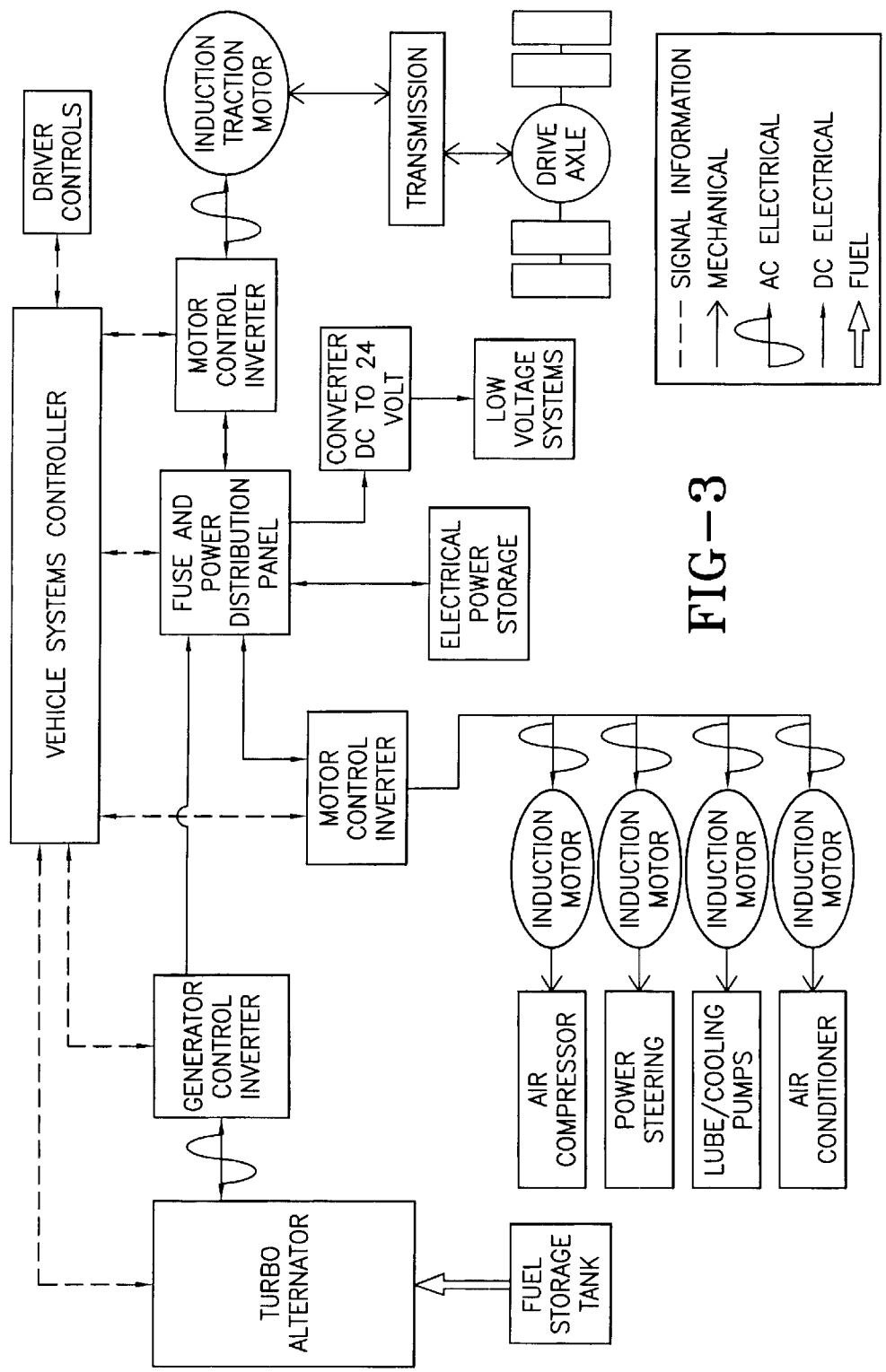
FIG. 3 illustrates one embodiment of a series hybrid electric vehicle having multiple accessory motors.
Figure 4:
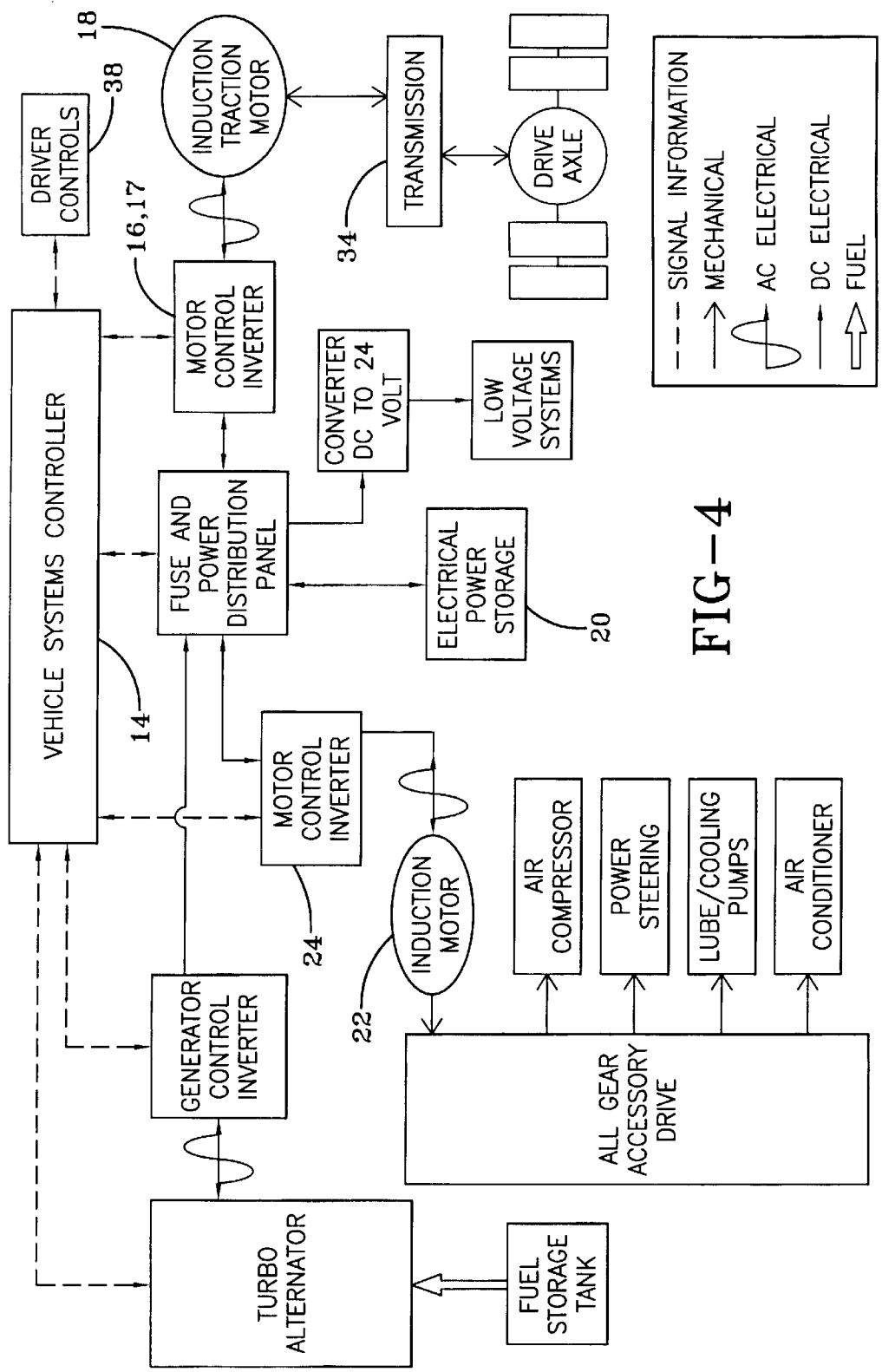
FIG. 4 illustrates one embodiment of a series hybrid electric vehicle using a turbine engine.

FIG. 2 illustrates one embodiment of a series HEV of the present invention. The embodiment of FIG. 2 is a series HEV drive system where the electric motor 18 is driven by both the APU generator and the energy storage system 20. FIG. 3 illustrates one embodiment of the series HEV having multiple accessory motors. FIG. 4 illustrates one embodiment of the series HEV using a turbine engine.

The electric motor 18 converts electrical energy to mechanical energy through the interaction of magnetic fields. In one embodiment, the electric motor 18 may be a three-phase AC induction motor rated at 200 hp. The electric motor 18 may be wound for high frequency and high currents. The rotor may be precision balanced for speeds up to 12,000 RPM.

In one embodiment, the electric motor is connected to the drive shaft via a two-speed gearbox (having hydraulic clutches). The gearbox may be adapted to allow 0–40 miles per hour in first gear. The use of a direct coupled two-speed gearbox eliminates torque converter losses and provides a smoother ride. Furthermore, a properly sized smaller motor may be used and increases efficiency.

The transmission 34 optimizes motor characteristics (speed and torque) to the speed and torque requirements of the vehicle. In one embodiment, the gear ratios may be 4.8 to 1 in high and 7.6 to 1 in low. The transmission 34 may utilize a power shift to high gear using 24-volt electrohydraulic valves. The transmission 34 may also accommodate 220 lbs-ft input torque @ 5500 RPM.

In the series embodiment, the APU 12 converts the stored source of potential energy to electrical power. In one embodiment, the engine 26 is an internal combustion unit configured for operation on Compressed Natural Gas (CNG). The generator 28 is preferably a high speed, wound field unit that is light weight. The APU 12 preferably has a control system and produces power at the lowest emission points with the highest fuel economy. The control system also provides APU 12 warnings and shutdowns at predetermined times. In a preferred embodiment, the APU is run at a fairly constant level during operation which reduces the high emissions found in conventional vehicles which have drive trains directly connected to the engine.

The motor control inverter 16, 17 may be a solid state transistorized device which accepts direct current from an on-board source (e.g., generator and/or energy source) and converts it to an alternating current to power the electric motor 18. In one embodiment, the inverter 17 pulses at 10,000 Hz with 0–400 Hz AC output for motor speeds up to 12,000 RPM. The motor controller is preferably adapted to use the throttle and brake pedal inputs to control motor torque for both acceleration and deceleration (regenerative braking). The motor controller is preferably adapted to be programmed according to vehicle specific requirements.

The energy storage system of FIG. 2 may be an ultracapacitor, e.g., 20. The ultracapacitor is preferably an electrochemical/electrostatic device that has an extremely high volumetric capacitance due to high surface area electrodes and very small electrode separation. The ultracapacitor stores charges and is discharged by applying a load between the capacitor terminals so that charge can flow to and from it. The ultracapacitor is preferably adapted to provide high energy for short durations required for acceleration and a place to capture electrical power during regenerative braking.

In one embodiment, the ultracapacitor is a bank of thirty ultra-capacitors. The bank is capable of storing 1.6 MJ of energy (20 Farads at 400 volts). The state of charge of the capacitors may be very accurately determined from the measured terminal voltage. Capacitors provide significant advantages over batteries since batteries exhibit hysteresis in their voltage, current, and state of charge relationships. Batteries also must be current limited and/or cell voltage limited. Near full charge, lead acid batteries cannot accept high currents without plate damage. Capacitors accept very high currents. Capacitors also approach their voltage limits more slowly and do not experience damage while accepting currents just below their maximum charge. The ultracapacitor bank also allows for the exceptional recapture of energy that would otherwise be lost during braking.

In an alternate embodiment, two series strings of twenty-eight 12-volt batteries were used as the energy storage system. Optima D750S 12-volt batteries may be used. It is appreciated that other battery technology may also be used.

The power management control and data acquisition system (FIG. 5) is preferably comprised of a systems controller 14 and a data acquisition system 40. The systems controller 14 and data acquisition system 40 may be combined into one processing unit or separate processing units. The systems controller 14 and data system 40 may be computer-based or micro-controller-based. The vehicle systems controller 14 receives signals from the driver controls 38 (e.g., accelerator) for controlling driving output. This driving output (e.g., traction command) is preferably received at the APU and the motor controller 16, which are programmed to vary motor 18 torque based on the signals.

The vehicle controller 14 is preferably programmed with an APU power set-point. In one embodiment, a control computer such as the power management controller 14 is used to set the power set-point. The power set-point may be set manually or automatically. The controller then determines the optimum engine speed for that power level and command or adjusts the engine to that speed.

The HEV system of the present invention preferably uses regenerative braking to improve fuel efficiency. This technology recovers much of the kinetic energy of the vehicle during deceleration. Regenerative braking utilizes the principle that a conductor that is moved through a magnetic field has voltage induced across it. Through the use of switching the inverter 17, commanded by the controller 16, the motor 18 in effect acts as a generator to supply current to the energy storage system 20. This replenishes the energy storage system 20 each braking cycle and extends the life of the mechanical brakes.

It is also preferred that the power management system monitor and maintain the capacitor voltage level in a predetermined range. For example, a proportional-integral (PI) control algorithm may be used to control the capacitor voltage within a predetermined range (225–400 volts). This is preferably accomplished by varying the power requested from the APU. Optimizing the state of the energy storage system during the driving cycle allows for a full recovery during braking. In an alternative embodiment, the power to the energy storage system is manually controlled through the power management system to maintain the energy level at a predetermined set-point. The system electric bus is preferably connected to the ultracapacitor so that the electric bus voltage equals the capacitor voltage (e.g., looking at FIG. 1, the block dot or node would represent the electric bus and the voltage across the node is the electric bus voltage). The capacitor voltage varies directly with the variance of the electric bus voltage.

The system of the present invention preferably has an instrumentation system e.g., FIG. 5. The APU preferably has an integral instrumentation system that monitors APU output voltage, output current, engine speed, coolant temperature and oil pressure. This data may be sampled at a predetermined frequency (1 hz) and transmitted to the power management system via a controller area network (CAN) interface. A thermocouple may also be mounted on the APU to monitor its temperature. In one embodiment, the power management controller 14 is an external laptop PC.

Other measurements may be obtained via the data acquisition system 40. In one embodiment, the data acquisition system is a MegaDAC data acquisition system sampling at 100 Hz. Thermocouples are preferably used to measure temperature. Hall effect transducers are preferably used for current measurements. The power management system is preferably synchronized with the data acquisition system 40.

Upon cold start with the vehicle stopped, the engine of the APU will deliver power to the generator and to auxiliary loads. If the capacitor bank is below a predetermined low voltage set-point, the control will allow the generator to operate at its maximum current limit, charging the capacitors, until the low voltage set-point is reached. At the low voltage set-point, the generator will deliver rated power to the capacitors until the high voltage set-point is reached. As the high voltage set-point is reached, the generator control will reduce generator output to maintain the high voltage set-point; the engine control will reduce fuel and adjust speed to produce power to drive auxiliary loads at required output at minimum fuel consumption and emissions.

When the system is at or above the low voltage set-point and all other safety considerations are met, the traction inverter can be switched on and the vehicle may be driven.

When the operator pushes the accelerator for forward motion, the traction inverter will deliver current up to maximum rating to the traction motor to produce required torque and increase output frequency to accelerate the vehicle. As the motor converts energy from the capacitor bank, voltage begins to drop in the system. The control system begins to throttle the APU/PPU engine at a rate proportional to the acceleration required up to the average traction power value. This value may be adjusted up or down during operation to accommodate various driving conditions to optimize fuel economy. As long as the accelerator is pushed, the traction drive will continue to deliver positive torque to the vehicle. If the power required is low, the voltage in the system will begin to rise and the APU/PPU power is reduced. If the power required is high, the voltage will continue to drop. If the voltage dips near the lower set-point, indicating that the capacitor bank is near depletion, the control system increases APU/PPU output to match the power required while optimizing fuel consumption. As the lower voltage set-point is approached and the power requirement is high, the APU/PPU will deliver required power. If the power required is more than the APU can deliver, the system voltage will continue to drop and the traction drive control may reduce traction output power to hold voltage at the low set-point. This strategy will hold true as long as the torque command is above the torque output.

When the operator reduces the acceleration signal, the system control will reduce power to the traction motor. The control will also reduce APU/PPU output proportionally to maximize fuel economy and hold voltage near the low set-point. If the torque signal is reduced to near zero, and the vehicle is below rated speed, the voltage will be allowed to rise inversely proportional to vehicle speed. The greater the vehicle speed the less the voltage will be allowed to rise. This strategy provides for some APU/PPU power to be stored in the capacitor bank to make up for system losses, anticipate the next acceleration event, and still allow reserve capacitor storage for a braking event. This value may be adjusted up or down during operation to accommodate various driving conditions to optimize fuel economy.

When the operator signals a braking event, usually by pushing the brake pedal, a negative (reverse) torque signal is produced proportional to the deceleration desired. In this mode, the traction control/inverter reduces frequency to the motor and develops a current proportional to the torque signal, up to the maximum rated for the motor and inverter. The voltage of the system will begin to rise as the capacitors begin to store energy, and the APU/PPU power is reduced to minimum. As the vehicle slows, regeneration will continue, charging the capacitors causing voltage to continue rising. As the capacitor voltage approaches the upper set-point, the traction drive will reduce torque to maintain the voltage below the set-point. If more braking action is required than is available from the traction drive, the friction brakes will be applied to supplement the deceleration event until the vehicle is stopped.

When the vehicle is stopped, the capacitor bank should be at full charge ready for the next acceleration event.

The APU/PPU generator output is adjusted to top up the capacitor bank, if needed, and maintain the high voltage set-point, while the engine is set to produce power to drive auxiliary loads at the required output at minimum fuel consumption.

The cycle begins again when the accelerator pedal is depressed.

Reverse motion needed for backing up the vehicle works in a similar manner as the above except inverter output is sequenced to reverse the motor. Depending on transmission selected, the transmission can provide the reversing function.

Provisions for sequencing of a multi-speed transmission, when included in the application, are also included. The program within the controller automatically reduces motor torque and signals the shift when a signal is received from the operator. The controller can also automatically signal a shift, if desired, to optimize operating parameters.

Additional control strategies are incorporated into the system to deal with abnormal conditions to insure trouble free, safe operation while protecting critical components.

Figure 6A:
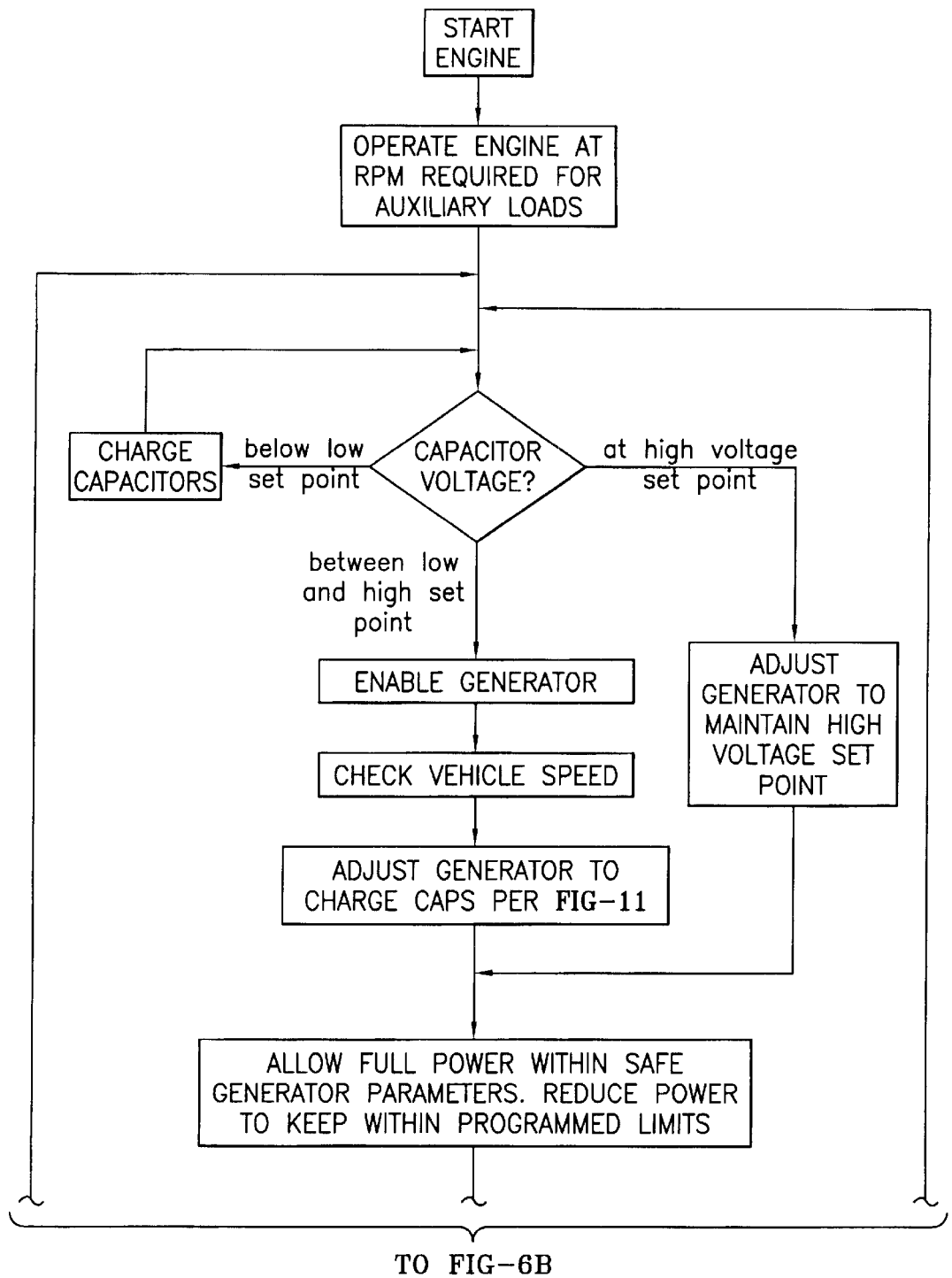
FIGS. 6A–6B illustrate flowcharts depicting the power management process of a preferred embodiment of the present invention.
Figure 6B:
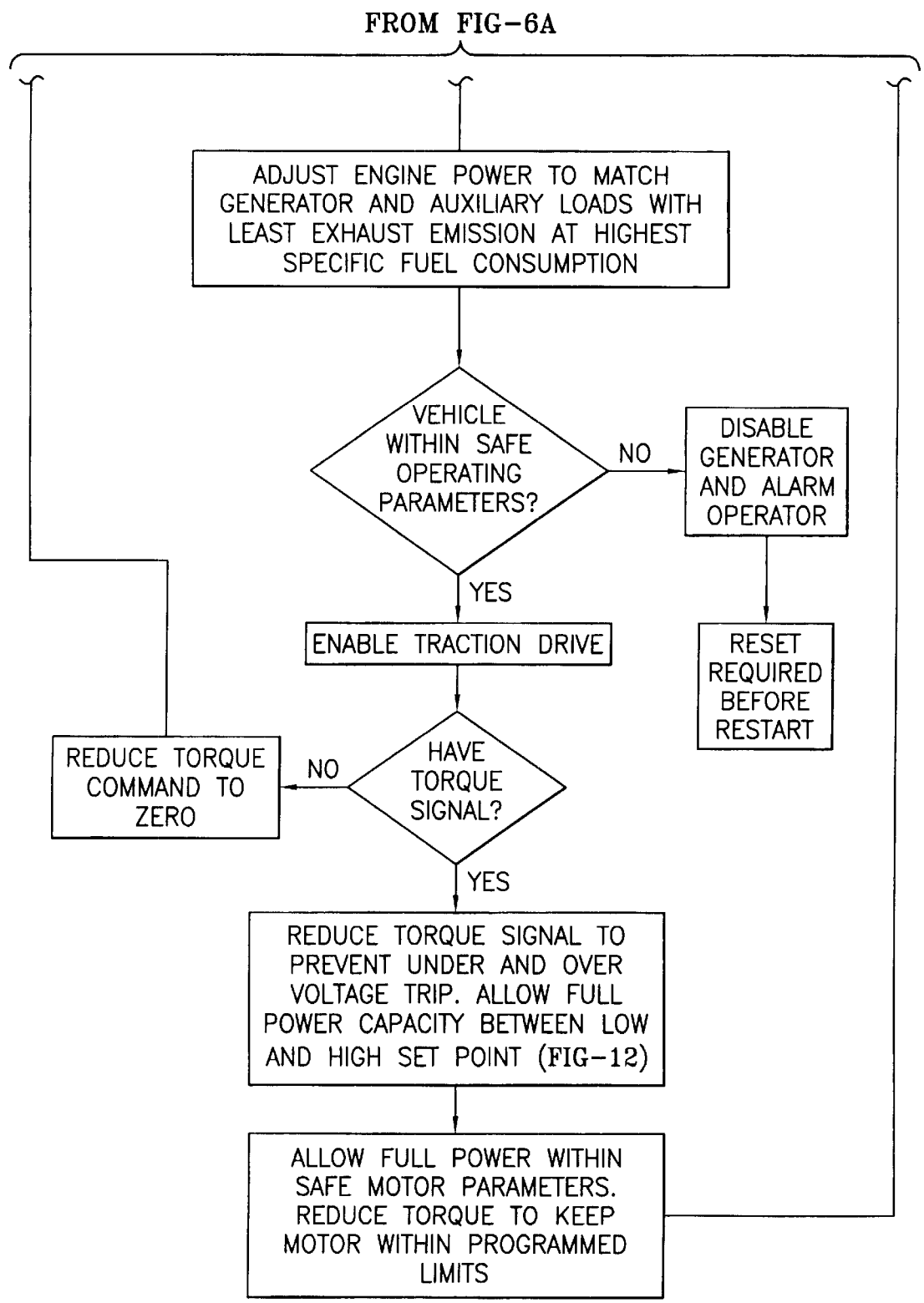
Figure 7:
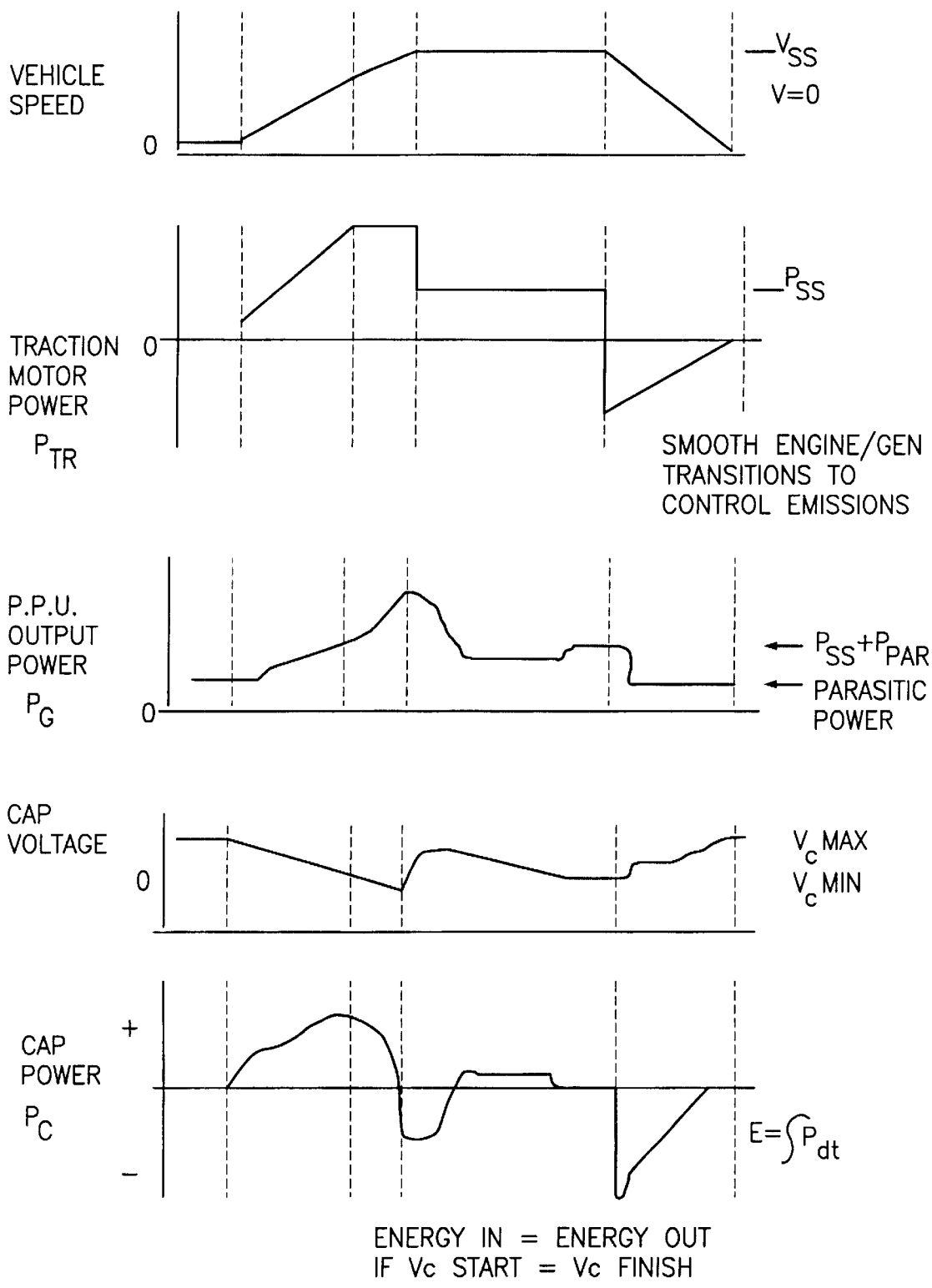
FIG. 7 illustrates charts depicting the power management control of the present invention.

FIGS. 6A–6B illustrate flowcharts depicting the power management process of a preferred embodiment of the present invention. FIG. 7 illustrates charts depicting the power management control of the present invention.

Parallel Embodiment

Figure 8:
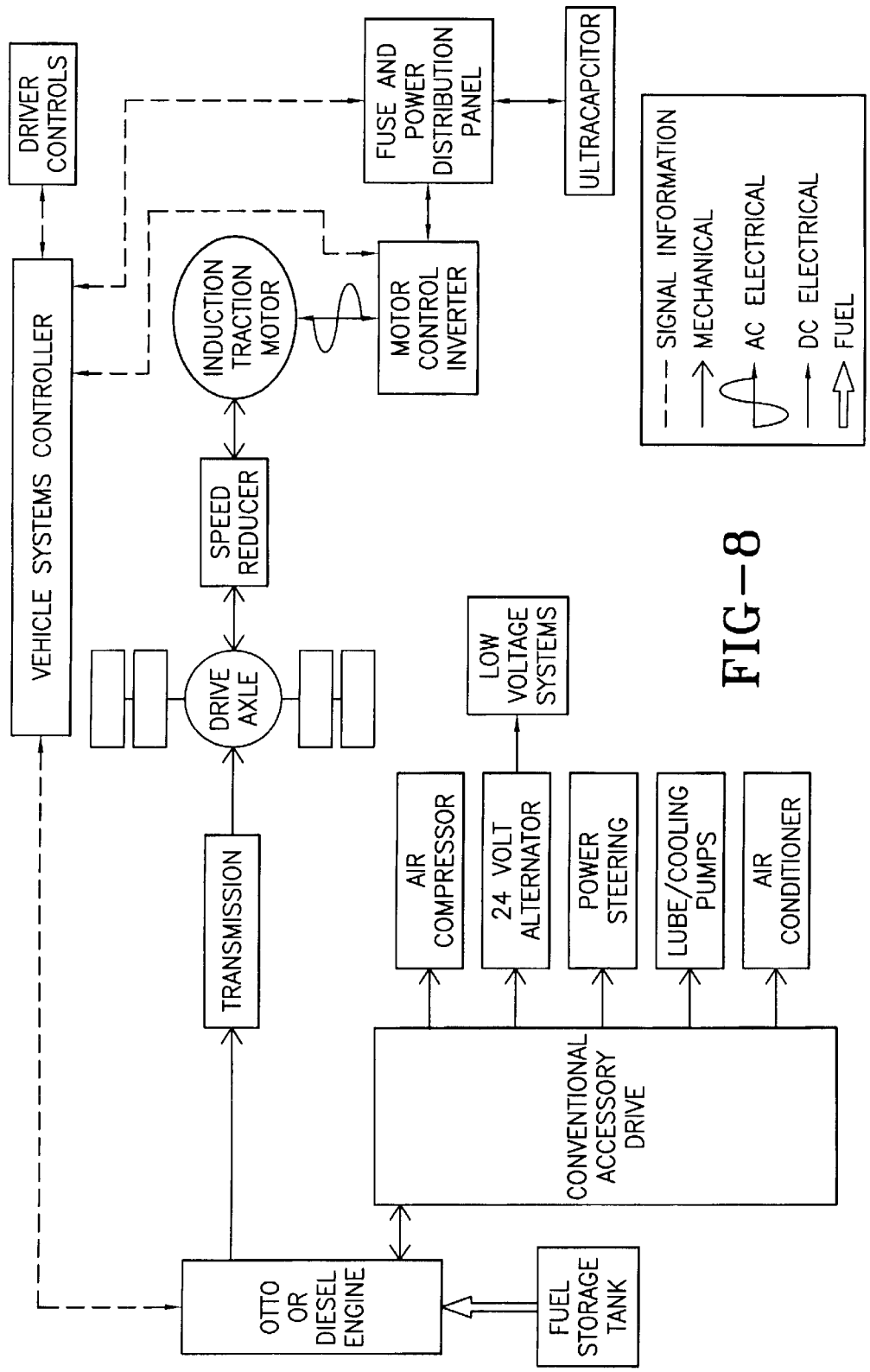
FIG. 8 illustrates one embodiment of a parallel hybrid embodiment of the present invention.

FIG. 8 illustrates one embodiment of a parallel hybrid vehicle of the present invention. In contrast to those used in a battery hybrid system, the components and control strategies of the present invention have been designed to allow for a wide fluctuation in voltage without performance loss or nuisance trip outs. The system is designed to optimize APU/PPU performance with the least amount of capacitor bank requirement. The system does not require any device between the inverter drive and capacitor bank. In its parallel form, the three major components can be easily added or retrofitted to conventional engine drive systems to hold costs down. The parallel embodiment described below may be called an engine dominated, capacitor assist, parallel hybrid system.

The hardware for the parallel system preferably consists of three major components:

1. One or more low inductance traction motor(s), capable of delivering rated torque and power at the low voltage set point. The motor(s) is (are) parallel coupled to the mechanical power train via torque shaft either to a live power takeoff from a traditional transmission or to the back output shaft from a front tandem drive axle or through a separate drive axle. During braking or cruising, the motor(s) will become a generator to charge the capacitors. The hybrid parallel motor is typically sized smaller in output than the motor sized for a series drive since it does not have to provide all of the traction effort.

2. One or more inverter(s) capable of delivering rated power to the motor at the low voltage set point. Components sized to operate at the high voltage set point. Controls set up to eliminate instability at high voltage when using a low inductance motor.

3. One or more capacitor bank(s) sized to deliver above average traction power for accelerating the vehicle to rated speed and capturing braking energy from regeneration.

To make the system cost effective, the parallel hybrid design supplements the traditional vehicle drive. Power for the vehicle is derived from an engine of any variety that can be coupled to an automatic type mechanical transmission with lock up torque converter to a drive axle(s). A continually variable mechanical transmission can also be utilized. The engine/transmission combination is optimized to deliver rated power between the high and low voltage set points, peak vehicle required power when energy in the capacitor bank is depleted, and average power during acceleration. The engine and transmission combination is electronically controlled by the system controller to minimize power transients in order to reduce exhaust emissions, and increase fuel efficiency. No additional generator or control is utilized or connected to the engine as in the series hybrid configuration. Auxiliary loads as air conditioning, brakes, steering and the like are powered mechanically directly from the engine. Mechanical drive ratios are selected to meet loads and minimize losses.

The control strategy preferably utilizes the following:

1. Input parameters used in the control strategy calculations include engine speed, motor speed, vehicle speed, temperature, electrical bus voltage, motor current, positive or forward (acceleration) command, direction, and negative (deceleration) command. Other inputs may also be included depending on application.

2. Control output commands include motor torque, voltage and current, engine speed, engine power, and shift command for transmission equipped vehicles. Other outputs may also be included depending on application.

In a preferred embodiment, the system preferably operates as follows:

When first started, with the vehicle at rest, the engine will deliver power to the auxiliary loads. If the capacitor bank is below the low set point, the control will hold the transmission or rear axle in neutral and cause the motor to operate as a generator. The motor will deliver power at its maximum current limit, charging the capacitors, until the low voltage set point is reached. Engine power is increased to match the required charge and auxiliary power. At the low voltage set point, the motor, operating as a generator will begin to deliver rated power to the capacitors. As the high voltage set point is reached, the control reduces motor output to maintain the high voltage set point, the engine control reduces power and adjusts engine speed to drive auxiliary loads at required power at minimum fuel consumption.

The transmission is enabled when all safety concerns are met such as air brake pressure. When the operator selects forward or reverse, the motor will stop generating, the engine power is reduced to idle before a shift is made and the vehicle driven. As long as the electrical system is at, or above, the low voltage set point, and all safety considerations are met, the inverter will remain energized and the transmission can be shifted, allowing the vehicle to be driven.

If voltage drops below or does not reach the low voltage set point, the inverter will not be energized and an alarm will be indicated. If safety concerns are met, the transmission can be shifted and the vehicle driven in a conventional manner. However the electrical drive will not operate.

Under normal operation, when the operator pushes the accelerator for forward motion, the inverter will deliver current up to maximum rating to the motor to produce positive torque and increase the output frequency to accelerate the vehicle. At the same instant engine power is slowly increased until it either reaches the average required traction power value or until the acceleration rate for the vehicle matches driver request. The transmission torque converter will lockup when engine speed and vehicle speed match. The motor drive, operating at full output, and the engine operating at average output are sized to accelerate the vehicle according the required drive cycle parameters for the vehicle. The vehicle speed to capacitor voltage is an inversely proportional ratio which is programmed into the control algorithm to achieve the best performance and efficiency for the application. The higher the speed, the lower the voltage. This ratio can be adjusted during operation by a fuzzy logic algorithm also built into the control strategy. This control algorithm can also be adapted for use with the series HEV embodiment.

As the motor draws power from the capacitor bank, voltage begins to drop in the system. If the power required is high, the voltage drop rate will be high and the engine power will be increased to achieve the desired speed voltage ratio. If the rate of voltage drop is greater than the programmed speed to voltage ratio indicates, the control system throttles the engine to make up the required power up to the average traction power value. This average traction power value may be adjusted up or down during operation to accommodate various driving conditions and optimize fuel economy. As long as the accelerator is pushed, the engine and traction motor will continue to deliver positive torque to the vehicle. If the power required is low, the voltage drop rate in the system will be low and the engine power is reduced until the desired speed/voltage ratio is achieved.

If the voltage dips near the lower set-point, indicating that the capacitor bank is near depletion, the control system proportionally increases engine output to match the power required while attempting to optimize fuel consumption. When the low voltage set point is reached, the traction drive control reduces motor output power to zero which holds the voltage at the low set point. At this time the engine will be delivering 100% of traction power requirements up to its maximum rated power. This logic will hold true as long as positive torque (acceleration) is required.

When the operator reduces the acceleration signal as when cruising or coasting, the control will match engine power to traction requirement while maximizing fuel economy. If the engine is operating below average power and the speed/voltage ratio is higher than optimum, the inverter will cause the motor to generate, taking power from the engine. The voltage will begin to rise in the system. If the engine is operating above average power and the speed/voltage ratio is lower than the optimum, the inverter will cause the motor to produce positive torque, which reduces power from the engine. The voltage will begin to drop in the system. When the programmed speed/voltage ratio is achieved the generating and motoring functions are terminated allowing the motor to free wheel. In the cruise mode, the motor controller is programmed to produce traction power only when engine power is above average and generate when the engine power is below average.

When the throttle is lifted, the engine power is reduced to near zero. If the speed/voltage ratio is higher than desired for the vehicle speed, the generator function is employed. Voltage will rise inversely proportional to vehicle speed. The greater the vehicle speed the less the voltage will rise. This strategy provides for some power to be stored in the capacitor bank to make up for system losses in anticipation of the next acceleration event and still allow reserve capacitor storage for a braking event. This value may be adjusted up or down during operation to accommodate various driving conditions and to optimize fuel economy. If the operator signals another acceleration event, engine power is slowly increased and the traction drive is employed to meet the demand.

If the operator signals a braking event, usually by pushing the brake pedal, engine power is reduced to near zero, a negative (reverse) torque is produced by the motor proportional to the deceleration desired. In this mode (regeneration), the inverter reduces frequency to the motor and develops a current proportional to the torque signal, up to the maximum rated for the motor and drive. The voltage of the system will begin to rise as the capacitors begin to absorb energy. As the vehicle slows, regeneration continues, charging the capacitors and causing voltage to continue rising. As the capacitor voltage approaches the upper set point, the traction drive reduces torque to maintain the voltage at the set point. If more braking action is required than is available from the traction drive, the friction brakes are applied to supplement the deceleration event until the vehicle stops. The torque converter is unlocked when the vehicle speed approaches engine high idle speed.

When the vehicle is stopped, the capacitor bank should be at full charge, ready for the next acceleration event. As long as the vehicle is stopped, the engine power is adjusted to produce power to drive auxiliary loads at the required output at minimum fuel consumption. The above cycle is repeated when the accelerator pedal is depressed.

Reverse motion needed for backing up the vehicle works in a similar manner as the above except inverter output is sequenced to reverse the motor. The automatic transmission is also utilized to provide a reverse motion.

Provisions for sequencing a multi-speed transmission, when included in the application between the motor and vehicle mechanical drive, is also included. The program within the controller automatically reduces motor torque and automatically signals a shift up or down to optimize operating parameters.

Additional control strategies are incorporated into the system to deal with abnormal conditions to insure trouble free, safe operation while protecting critical components.

Figure 9A:
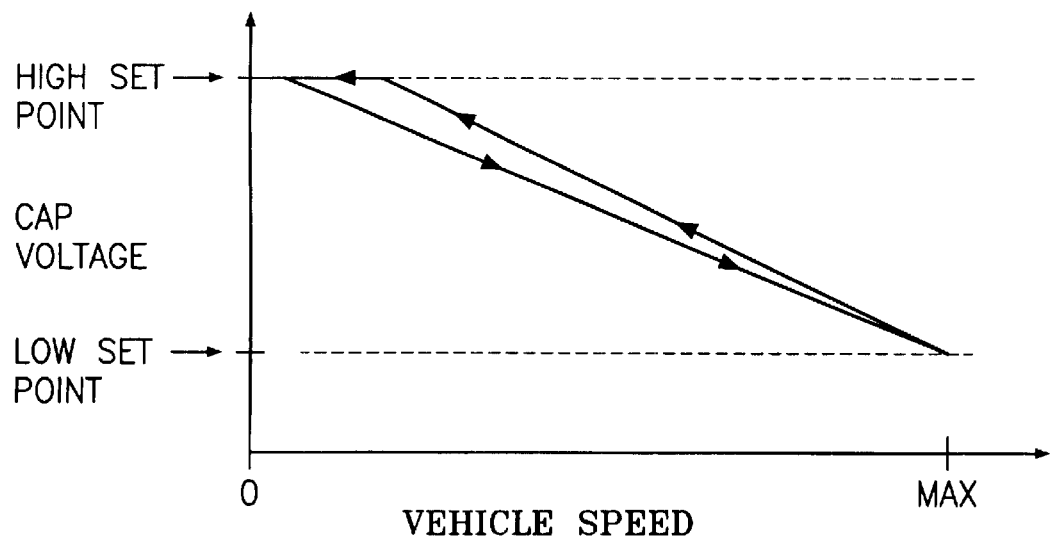
FIGS. 9A–9B illustrate vehicle speed versus capacitor voltage graphs for parallel and series embodiments.
Figure 9B:
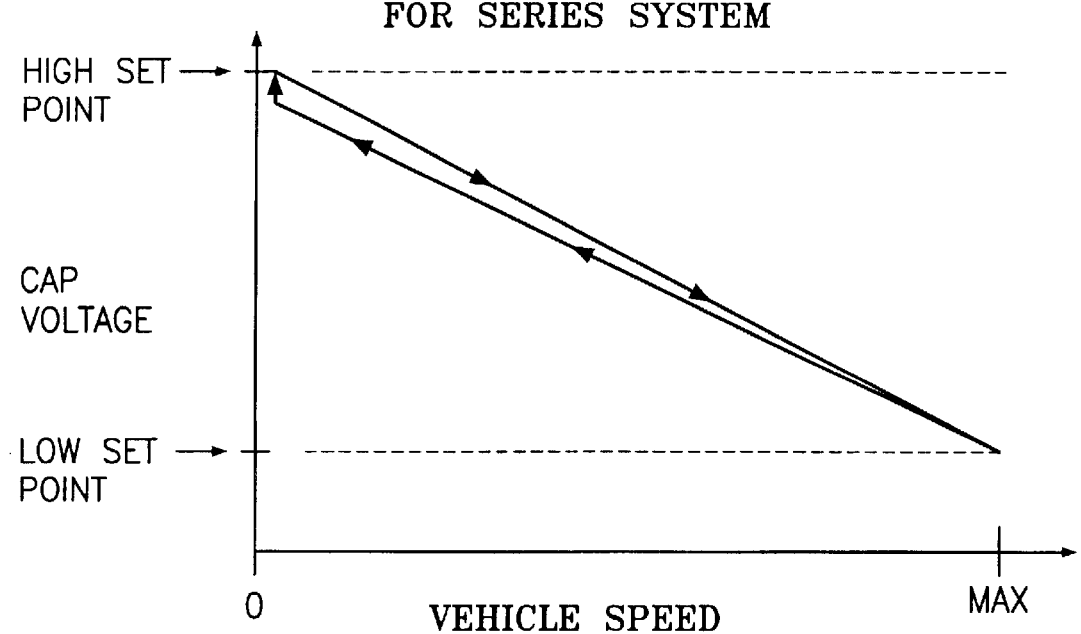

FIGS. 9A–9B illustrate vehicle speed versus capacitor voltage graphs for parallel and series embodiments.

Figure 10:
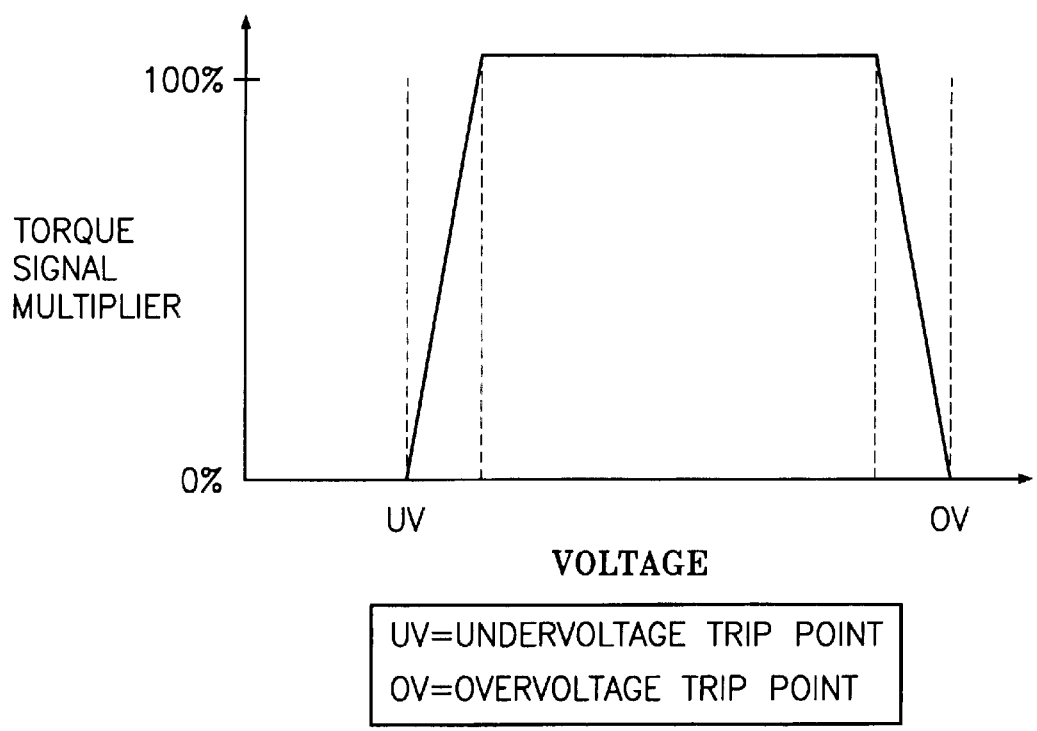
FIG. 10 illustrates a graph depicting an algorithm employed to modify the torque signal that maintains the voltage within specified limits.

FIG. 10 illustrates a graph depicting an algorithm employed to modify the torque signal that maintains the voltage within specified limits.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A hybrid electric vehicle comprised of:
   a drive train;
   an electric motor for driving said drive train;
   a power unit electrically coupled to said electric motor,
   an electric energy storage system electrically coupled to said electric motor; and
   wherein said power unit and said electric energy storage system provide electricity to said electric motor for powering said vehicle;
   a power management controller programmed to control output power of said power unit to maintain said energy storage system between a predetermined high voltage set-point and a predetermined low voltage set-point;
   wherein voltage levels of said energy storage system are maintained by an inversely proportional ratio of vehicle speed to storage voltage; and
   wherein power from said power unit is increased to maintain the desired ratio of vehicle speed, to storage voltage if said voltage level of said energy storage system drops at a fester rate than desired.

2. A hybrid electric vehicle according to claim 1 wherein said power unit is an engine in combination with a generator.

3. A hybrid electric vehicle according to claim 1 wherein said motor derives power from said energy storage system and said power unit during acceleration when said motor requires power below a predetermined average power level.

4. A hybrid electric vehicle according to claim 1 wherein said power management controller is programmed to drive said motor by said electric energy storage system when said motor requires power above a predetermined average power level.

5. A hybrid electric vehicle according to claim 1 further comprising:
   an electric bus connected to both the power unit and the electric energy source and where the voltage across the electric bus is substantially the same as the voltage across said electric energy source so that a change in voltage of the electric bus results in the same change to the voltage across the electric energy source.

6. A hybrid electric vehicle according to claim 1 wherein said power management controller is programmed to allow the power unit to recharge said electric energy storage system when power required by said electric motor is below a predetermined level.

7. A hybrid electric vehicle according to claim 1 wherein said power management controller is programmed to determine an optimum engine speed of said power unit for said predetermined set-points, and wherein said power management controller is adapted to control said power unit to said optimum engine speed.

8. A hybrid electric vehicle according to claim 7 wherein said power management controller is programmed with a speed load curve to produce power at the point of lowest emissions and greatest fuel economy.

9. A hybrid electric vehicle according to claim 1 wherein said energy storage system is a bank of ultracapacitors.

10. A hybrid electric vehicle according to claim 1 wherein said power management system is programmed with a control algorithm to maintain an energy storage system voltage within a predetermined range.

11. A hybrid electric vehicle according to claim 10 wherein said predetermined range is maintained by varying the output of said power unit.

12. A hybrid electric vehicle according to claim 1 wherein said power management controller is set with an average power unit level, and when in a cruise mode power is only drawn from said energy storage system when the power level of said power unit is above said average power unit level.

13. A hybrid electric vehicle according to claim 1 further comprising:
   a two-gear gearbox coupled to said electric motor and said drive train.

14. A hybrid electric vehicle according to claim 1 further comprising:
   an auxiliary motor in electrical connection to said power unit and said electric energy storage system for driving accessory vehicle components.

15. A hybrid electric vehicle according to claim 1 wherein said electric motor is a low induction motor capable of delivering rated torque and power at said predetermined low voltage set-point.

16. A hybrid electric vehicle according to claim 1 wherein said power unit is comprised of:
   an engine; and
   generator coupled to said engine.

17. A hybrid electric vehicle according to claim 1 wherein said energy storage system is an ultracapacitor bank, and wherein said power management controller runs the output of said power unit at said predetermined average power level when said energy storage system is at a predetermined range between said high and low voltage set-points, said range having a low threshold point and high threshold point.

18. A hybrid electric vehicle according to claim 17 wherein said power management controller initiates an increase in the output of said power unit when the energy level of said energy storage system falls below the low threshold point of said range.

19. A hybrid electric vehicle according to claim 18 wherein said power unit provides substantially all of the power when said energy storage-system is at the low-voltage-set-point.

20. A hybrid electric vehicle according to claim 19 wherein said power management power controller is programmed to control motor output to prevent said power unit from running above maximum-rated power.

21. A hybrid electric vehicle according to claim 17 wherein said power management controller initiates a decrease in the output of said power unit when the energy level of said energy storage system reaches the high threshold point of said range.

22. A hybrid electric vehicle according to claim 17 wherein said average power level of said power unit is adjusted during operation of said electric vehicle to optimize fuel economy.

23. A hybrid electric vehicle according to claim 17 wherein said power management controller is programmed to proportionally decrease the output of said power unit to maximize fuel economy and to hold said storage system at said predetermined low voltage set-point when said power management system receives a decelerate signal.

24. A hybrid electric vehicle according to claim 23 wherein said ultracapacitors are recharged inversely proportionally to vehicle speed during deceleration.

25. A hybrid electric vehicle according to claim 17 wherein said power management controller is programmed to initiate production of a reverse motor torque signal proportional to the deceleration desired when a brake signal is received by said power management controller.

26. A hybrid electric vehicle according to claim 25 wherein said power management system allows recharging of said ultracapacitors during braking and wherein output of said power unit is reduced to a minimum during recharging.

27. A hybrid electric vehicle according to claim 1 wherein the difference between set predetermined high and low voltage points is 230 volts.

28. A hybrid electric vehicle according to claim 1 wherein said power management controller is a laptop personal computer.

29. A hybrid electric vehicle according to claim 1, further comprising:
   a data acquisition component in electrical communication with said power management controller adapted to collect engine speed data, motor speed data, vehicle speed data, temperature data, motor current, generator current, acceleration commands, deceleration commands, braking commands.

30. A hybrid electric vehicle according to claim 1 wherein said power management controller is adapted to issue output commands to control motor torque, generator voltage and current, engine speed, engine power, and shift commands for transmission equipped vehicles.

31. An electric vehicle power management system comprising:
   an electric motor;
   a power unit electrically coupled to said electric motor;
   an ultracapacitor electrically coupled to said electric motor; and
   wherein said power unit and said ultracapacitor provide energy to said electric motor for powering said vehicle;
   a power management controller that is adapted to store a predetermined average power level for said power unit, and wherein said power management controller is programmed to control output power of said power unit to maintain said ultracapacitor between a predetermined high voltage set-point and a predetermined low voltage set-point;
   wherein said power management controller runs the output of said power unit at said predetermined average power level when said ultracapacitor is in a predetermined range between said high and low voltage set-points, said range having a low threshold point and high threshold point;
   wherein said power management controller is adapted to increase the output of said power unit when the energy level of said ultracapacitor falls below the low threshold point of said range;
   wherein said power management controller is adapted to decrease the output of said power unit when the energy level of said ultracapacitor reaches the high threshold point of said range;
   wherein voltage levels of said ultracapacitor are maintained by an inversely proportional ratio of vehicle speed to ultracapacitor voltage; and
   wherein power output from said power unit is changed to maintain the desired ratio of vehicle speed to ultracapacitor voltage.

32. A power management system according to claim 31 wherein said power unit is comprised of an engine coupled to a generator and wherein engine speed is varied proportionally to the variance with the output of the power unit.

33. A hybrid electric vehicle comprised of:
   a dive train;
   an electric motor for driving said drive train;
   an engine for driving said drive train;
   an electric energy storage system electrically coupled to said electric motor;

wherein said engine and said electric energy storage system power said vehicle;

a controller programmed to control said engine to vary output power of said engine to meet power requirement and to substantially maintain said energy storage system between a predetermined high voltage set-point and a predetermined low voltage set-point;

wherein voltage levels of said energy storage system are maintained by an inversely proportional ratio of vehicle speed to storage voltage; and wherein power output from said power unit is changed to maintain the desired ratio of vehicle speed to storage voltage.

34. A hybrid electric vehicle according to claim 33 wherein said controller is programmed to allow the motor to recharge said electric energy storage system when engine power is below a predetermined level.

35. A hybrid electric vehicle according to claim 33 wherein fuzzy logic algorithms are used by said controller to adjust the speed to voltage ratio.

36. A hybrid electric vehicle according to claim 33 wherein said motor acts as a generator when said speed to voltage ratio is higher than a predetermined level.

37. A hybrid electric vehicle according to claim 36 wherein generation of voltage levels in said electric energy storage system by said electric motor rises inversely proportional to vehicle speed.

38. A hybrid electric vehicle according to claim 33 wherein said controller increases engine output to match required output when said electric energy storage system falls near said predetermined low voltage set-point.

39. A hybrid electric vehicle according to claim 33 wherein said controller is programmed to produce traction power from said electric energy storage system when in a cruise mode only when engine power is above a predetermined power level.

40. A hybrid electric vehicle according to claim 39 wherein said predetermined power level is adjusted during vehicle operation by said controller.

41. A hybrid electric vehicle according to claim 33 wherein said drive train may be place in the neutral position by said controller so that said motor can operate as a generator to recharge the electric energy storage system.

42. A hybrid electric vehicle according to claim 33 wherein said vehicle may be operated in a cruise mode wherein said controller is programmed to control said motor to recharge said electric energy storage system when said engine is below a predetermined power level and when said speed to voltage ratio is higher than desired.

* * * * *